INVENTOR
RAINER ANANDA SCHRAIVOGEL
BY Fred M. Vogel
AGENT

April 7, 1959 R. A. SCHRAIVOGEL 2,881,396

COMMUNICATION SYSTEM FOR THE TRANSMISSION OF SIGNALS THROUGH A CABLE

Filed Sept. 10, 1954 2 Sheets-Sheet 2

INVENTOR
RAINER ANANDA SCHRAIVOGEL
BY Fred M. Vogel
AGENT

United States Patent Office 2,881,396

Patented Apr. 7, 1959

2,881,396

COMMUNICATION SYSTEM FOR THE TRANSMISSION OF SIGNALS THROUGH A CABLE

Rainer Ananda Schraivogel, Hilversum, Netherlands, assignor, by mesne assignments, to North American Philips Company, Inc., New York, N.Y., a corporation of Delaware Application September 10, 1954, Serial No. 455,124

Claims priority, application Netherlands September 26, 1953

12 Claims. (Cl. 333—16)

The invention relates to a communication system for the transmission of signals through a cable via an intermediate amplifying station and a final amplifying station, each of these amplifying stations being provided with a level control-member to be governed by a level control-voltage and a pilot receiver receiving a transmitted pilot signal, from the output of which receiver the level control-voltage is derived, for example a carrier-wave telephone system, a television system, and the like. The invention may be applied to various types of communication systems, for example to four-wire and two-wire termination systems and the like.

Such communication systems require in practice a steady input level of the signal at the final apparatus, particularly in the case of long-distance signal transmission for example over 150 kms. and more, the transmission path then comprising a large number of amplifying stations provided with a level control-device. In general the level control in one amplifying station exerts an influence on the level control-devices in the subsequent amplifying stations, which results in an unsteady output level of the communication system (the so-called jitter).

The invention has for its object to provide a communication system of the kind described above, in which the difficulty referred to is reduced to a considerable extent by using simple means.

According to the invention the level control-device of the intermediate amplifying station is constituted by a line-balancing impedance having two adjusting values, the transition from one value of the operative line balancing impedance to its other value being performed gradually by means of a control-motor comprising a control-circuit connected to the output of the pilot receiver, this circuit including a maximum- and minimum-relay controlled by the level control-voltage, the level control-device of the final station comprising an adjustable impedance which can be controlled in accordance with the level control-voltage and the effective value of which is varied approximately proportionally to the level control-voltage.

By carrying out the invention the control apparatus in the intermediate amplifying stations is simple, so that great reliability in operation is obtained.

The invention and its advantages will now be described more fully with reference to the accompanying drawing.

Figure 1:
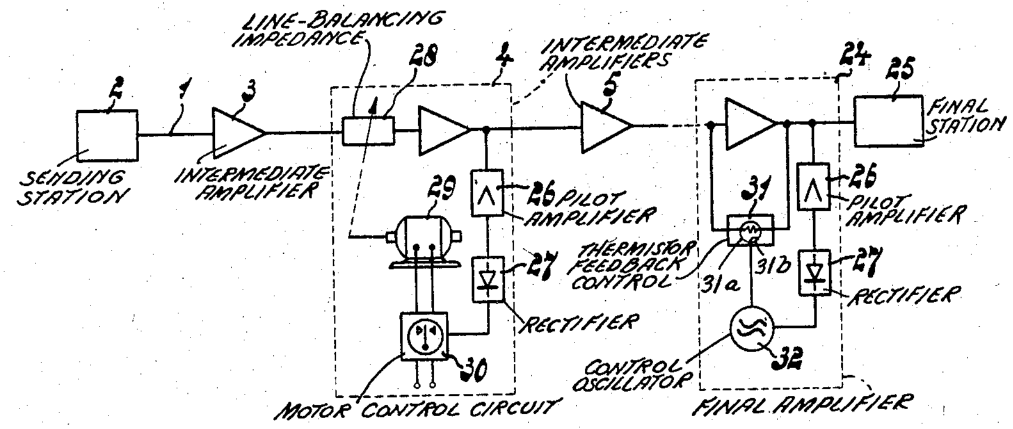
Fig. 1 shows in a block diagram a carrier-wave telephone system according to the invention, in which the transmission path constituted by a coaxial cable includes a plurality of intermediate amplifying stations and a final amplifying station.

Fig. 1 shows a carrier-wave telephone system according to the invention, which is arranged for carrier-wave telephone communication over a distance of 200 kms. along a coaxial cable 1, for example for the transmission of 960 speech channels in the frequency range from 60 kc./s. to 4 mc./s. In the 200 kms. carrier-wave telephone communication shown the carrier-wave telephone signals from a carrier-wave sending station 2 are supplied through intermediate amplifying stations 3, 4, 5 . . . 23 and a final amplifying station 24 to a carrier-wave final station 25. The distance between successive amplifying stations is about 9 kms.

In order to compensate level variations in the transmitted signals due mainly to damping variations in the transmission cable 1, each of the intermediate amplifying stations 4, 6, . . . 22 and the final amplifying station 24 is provided with a level-control member which is controlled in accordance with a pilot signal transmitted together with the speech signals along the coaxial cable 1, this pilot signal having a frequency of for example 4 mc./s. The intermediate amplifying stations 3, 5, . . . 23 do not comprise a level-control device.

In each of the amplifying stations 4, 6, . . . 24 the simultaneously transmitted pilot signal, subsequent to amplification in the amplifying station, is supplied to a pilot receiver connected to the amplifier output, this receiver being constituted by the cascade connection of a selective pilot amplifier 26, tuned to the pilot frequency, and a rectifying circuit 27, from the output circuit of which a direct control-voltage for level-control is derived.

In accordance with the invention, in order to reduce to a great extent the undue level variations at the input of the carrier-wave terminal station 25, which variations are due to the combined level variations of the control-devices in the various amplifying stations, the level control-member of each of the intermediate amplifying stations is constituted by an adjustable line-balancing impedance 28, having two adjusting values, the transition from one adjusting value of the operative line-balancing impedance to the other value being performed gradually by means of a control-motor 29, having a control-circuit 30 connected to the output circuit of the pilot receiver 26, 27, this control-circuit including a maximum- and minimum-relay governed by the level control-voltage, the level control-member 31 of the terminal amplifying station 24 comprising an adjustable impedance controllable in accordance with the level control-voltage, the effective value of this impedance varying approximately proportional to the level control-voltage.

In the system described above the level control-member 31, constituted by a frequency-dependent impedance, is included in a negative feed-back circuit of the terminal amplifying station 24. For level control the level control-member 31 is provided with an indirectly heated thermistor 31*a* having for example a negative temperature coefficient, to the filament wire 31*b* of which is supplied the output voltage of a control-oscillator 32 governed by the direct level control-voltage. Thus in the terminal amplifying station a level control varying continuously with the level control-voltage is obtained by controlling the negative feed-back factor of the terminal amplifying station 24. An increase in the pilot signal produces, for example a corresponding increase in the negative feed-back factor, which results in a decrease in amplification counter-acting the increase in level.

Figures 3, 4, 5:
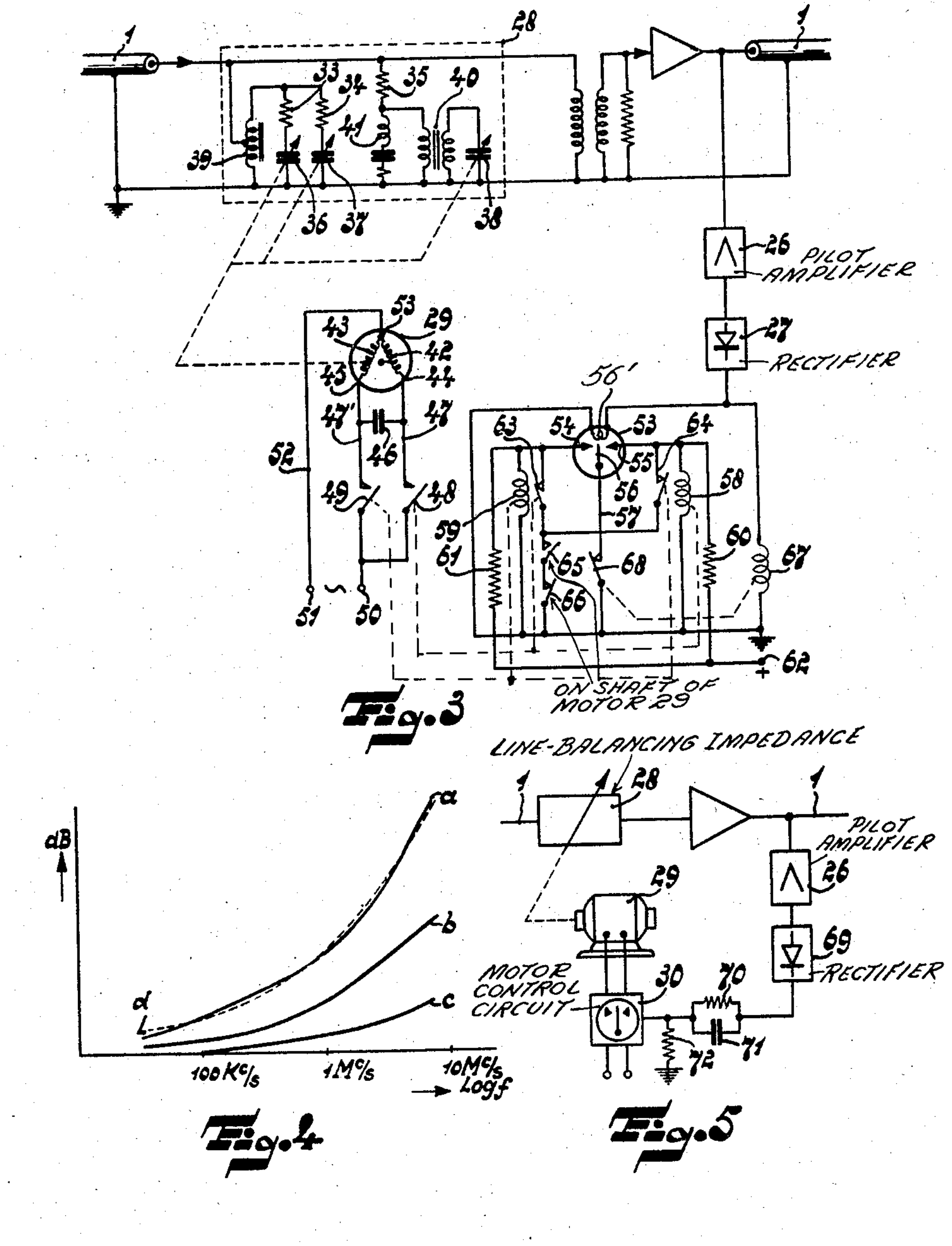
Fig. 3 is a detail view of the embodiment of an intermediate amplifying station.
Fig. 4 shows some damping characteristic curves to set out the operation of a control-member used in the intermediate amplifying station and Fig. 5 shows a further embodiment of an intermediate amplifying station.

Fig. 3 is a detail view of an intermediate amplifying station, in which the line-balancing impedance connected before the input of the amplifier is constituted by three parallel-connected damping branches including each a series resistor 33, 34 and 35 and a variable series capacitor 36, 37 and 38. The rotors of the series capacitors 36, 37 and 38 are seated on a common shaft, which is coupled with the control-motor 29, controlled in accordance with the pilot signal (cf. copending application U.S. Serial No. 442,084, filed July 8, 1954).

The damping branches 33, 36; 34, 37; 35, 38 have different time constants; the damping branches having time constants of successive values contribute to the slope of the damping characteristic curve mainly in adjacent parts of the frequency band. These time constants may for example be $3.10^{-8}$, $26.10^{-8}$ and $240.10^{-8}$ sec. at a maximum capacity of the variable capacitors 36, 37 and 38 respectively. In the circuit arrangement shown the branches 33, 36; 34, 37 are connected through an auto-transformer 39 to the coaxial cable 1, whilst the series capacitor 38 of the damping branch 35, 38 is included between the ends of the secondary winding of a coupling transformer 40, the primary winding of which is connected via the series resistor 35 to the coaxial cable 1. The transformer connection permits the use of small-sized capacitors.

In order to restrict the unwanted effect of parasitic impedances on the damping characteristic curve provision is made of a correction impedance 41, constituted by a damped series circuit having a tuning frequency of for example 400 kc./s. in parallel with the primary winding of the transformer 40.

In the circuit arrangement shown, upon the common rotor shaft of the variable capacitors being adjusted, the relative ratios between the time constants of the damping branches 33, 36, 34, 37 and 35, 38 are maintained constant and the curve of the damping as a function of frequency, which corresponds to a great approximation to the course of the cable damping variations, is also maintained.

For the sake of clearness Fig. 4 shows a few damping characteristic curves of the level control-member described above, in which the damping is plotted as a function of the logarithm of frequency for various positions of the common rotor shaft.

In this figure the curves *a* and *c* represent the damping characteristics for a maximum adjusting value and a minimum adjusting value respectively of the capacitors 36, 37 and 38, whilst the curve *b* represents the damping variation in an intermediate position. The curve *d* is a measured damping variation curve of the coaxial cable 1, corresponding to the damping characteristic curve *a* of the level control-member.

It has been found that the course of the curve *b* throughout the frequency range to be transmitted corresponds accurately to the damping curve *a* of the level control-member. The divergences between these two damping curves may for example be smaller than 0.1 db.

In the circuit arrangement the level control is carried out by means of an asynchronous alternating-current motor 29, comprising two windings 42 and 43, which are connected to one another at one end; a capacitor 46 is connected between the other ends 44 and 45. The ends 44 and 45 of the windings are connected through parallel-connected branches 47 and 47', including switches 48 and 49 respectively, to the terminal 50 of an energizing source, the other terminal 51 of which is connected through a conductor 52 to the junction 53 of the windings 42 and 43.

The switch 48 being closed and the switch 49 being open, the energizing current for the winding 42 in the circuit arrangement shown flows through conductors 47 and 52 and the energizing current for the winding 43 is conducted through capacitor 46, the phase difference between the energizing currents, which is caused by the capacitor, producing a rotating field. In the other case, i.e. if switch 49 is closed and switch 48 is open, the phase difference between the energizing currents has reverse polarity, so that the rotating field reverses its direction.

The control-circuit of the asynchronous motor includes a contact volt meter 53, connected to the output circuit of the pilot receiver, this meter comprising a minimum contact 54, a maximum contact 55 and a pointer 56, which pointer is actuated by a coil 56' and is connected to earth through a conductor 57. To each of the terminal contacts 54 and 55 of the contact volt meter 53 is connected the energizing winding of a relay 58 and 59 respectively, these relays being connected through a resistor 60 and 61 respectively to the positive terminal 62 of a supply battery. The relays 58 and 59 comprise a make contact 63 and 64 respectively, connected to the maximum and the minimum contact respectively of the contact volt meter 53 and also comprise the break contacts included in the energizing conductor of the control-motor 29, these break contacts being constituted by the switches 48 and 49 described above. The make contacts 63 and 64 of the relays 58 and 59 are interconnected through a conductor and connected to earth through contacts 65 and 66, seated on the motor shaft and corresponding to the two adjusting values of the level control-member.

If the level control-member is switched on in normal operation, the shaft contacts 65 and 66 are open and closed respectively and the relays 58 and 59 are energized through resistors 60 and 61 respectively, while the contacts 48 and 49 in the energizing conductor of the control-motor are open. If the pilot level drops below the minimum respond value of the contact volt meter, the pointer 56 of this meter establishes a contact with the minimum contact 54, so that the energizing winding of relay 59 is short-circuited through the circuit: contact 54, pointer 56, conductor 57, earth. The relay 59 is de-energized; contact 64 is opened and the relay contact 49 in the energizing conductor of the control-motor 29 is closed, after which the motor 29 is energized and the shaft contact 65 is closed. Owing to the movement of the control-motor 29 the damping of the level control-member 28 is gradually reduced, so that the pilot level increases gradually and the contact of the pointer 56 with the minimum contact 54 is interrupted. However, the control-motor remains energized, since the energizing winding of the relay 59 is then short-circuited through the circuit: relay contact 63, shaft contact 65, shaft contact 66, earth. When the minimum adjusting value of the control-member 28 is reached, the shaft contact 66 is opened, relay 59 is lifted, relay contacts 64 and 49 are closed and opened respectively, after which the control-motor 29 stops.

If, starting from this condition, the pilot level increases in excess of the maximum respond value of the contact voltmeter, a backward control occurs; the energizing winding of relay 58 is short-circuited, relay 58 is de-energized, contact 63 is opened, contact 48 is closed, the motor 29 is energized and the shaft contact 66 is closed. The control-motor 29 remains then energized until the initial operational condition is regained by the opening of the shaft contact 65.

In the circuit arrangement shown the output circuit of the pilot receiver 26, 27 includes the energizing circuit of a relay 67, comprising a make contact 68 included in the conductor 57 of the pointer 56 of the contact volt meter 53 to earth; this make contact opens when the pilot signal falls out. The control-member 29 remains adjusted to the position taken up last, since the relays 63 and 64 can no longer be de-energized, which yields the important advantage that at the omission of the pilot signal the carrier-wave telephone system is prevented from getting out of order.

Figure 2:
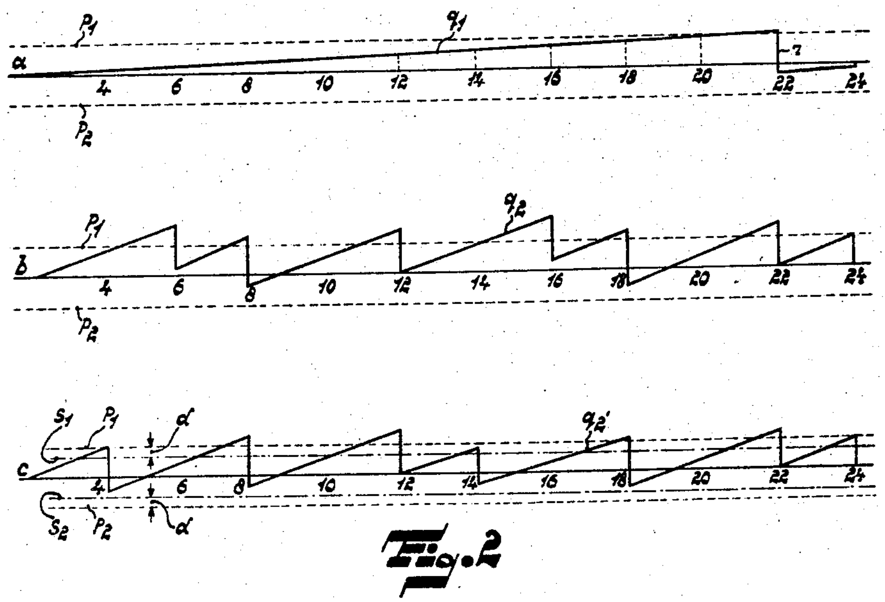
Fig. 2 shows a few level diagrams to explain the carrier-wave telephone system shown in Fig. 1.

Figs. 2*a* to 2*c* show some level diagrams of the carrier-wave telephone communication at various cable temperatures, the pilot level at maximum cable damping (cable temperature $T_{max}$) being plotted as the zero line. In these figures the controlled intermediate amplifying stations and the terminal amplifying station along the coaxial cable are designated by 4, 6; 22 and 24 respectively. The horizontal lines $p_1$ and $p_2$ represent the respond voltages of the level control-devices in the intermediate amplifying stations.

If, starting from the maximum cable temperature $T_{max}$, at which the level control-members in all intermediate amplifying stations are adjusted to the minimum adjusting value, the cable temperature is reduced, the pilot level along the carrier-wave telephone communication increases; Fig. 2*a* shows, by way of example, the pilot level at a cable temperature $T_1$ by the line $q_1$. At this cable temperature the pilot level $q_1$ exceeds the maximum respond voltage $p_1$ in the intermediate amplifying station 22, so that by the energization of the control-motor the level control-member is gradually adjusted to the maximum adjusting value.

In order to obtain a steady signal level control and more particularly an undisturbed telegraphy transmission, the control velocity is chosen to be small (smaller than 0.4 db per second), for example about 0.1 db per second. This means that in a total control-range of 4.5 db the transmission from one adjusting position into the other adjusting position is performed within about 45 seconds.

The level control in the terminal amplifying station in the system shown is sufficiently rapid to follow the pilot level variations produced by the operation of the level control-device in an intermediate amplifying station. In order to obtain a stable level control, the level decrease *r* due to the adjustment of the level control-member in the intermediate amplifying station 22 to the maximum adjusting value is smaller than the level difference between the two respond values $p_1$ and $p_2$, since otherwise the pilot level would drop below the minimum response value $p_2$ and a backward control would occur. In the embodiment shown the level decrease *r* is about ¾ of the level difference between the response values $p_1$ and $p_2$.

At a further reduction of the cable temperature the level control-members of more itermediate amplifying stations are switched on successively, until the level control-members of all intermediate amplifying stations are adjusted to the maximum adjusting value, when the minimum cable temperature $T_{min}$ is reached. Fig. 2*b* indicates the pilot level $q_2$ at a cable temperature $T_2$, at which the level control-members of the intermediate amplifying stations 6, 8, 12, 16, 18, 22 are switched on.

Fig. 2*c* shows the level diagram at the same cable temperature $T_2$. However in this case an interference level having an amplitude *d* occurs along the carrier-wave connection within the frequency band passed by the pilot receiver. The interference level exerts such an effect on the control-system in the intermediate amplifying stations so that the response values $p_1$ and $p_2$ are reduced by the amplitude *d* as is indicated in the figure by $S_1$ and $S_2$. Consequently, the control system in the intermediate amplifying stations adjusts itself in a manner such that the output level of the intermediate amplifying stations lies within the lines $S_1$ and $S_2$, or in other terms, the control-system adjusts itself automatically in a manner such that it is not sensitive to an interference level.

In the carrier-wave telephone system shown a transmission from one adjusting value to the other adjusting value in a level control-member in the intermediate amplifying stations occurs only very seldom. In this system it has for example been found that once during two or three days a change-over of the control-system in the intermediate amplifying stations takes place, the difference between the maximum and minimum cable temperature $T_{max}$ and $T_{min}$ being 10° C. and the difference between the response levels being 6 db. In this case the level control-devices of two to three intermediate amplifying stations are operative on an average, the total duration of the operation being about 2 minutes. During such a change-over the control-system in the terminal station follows the level variations produced; it has for example been found that in this case the pilot level at the output of the terminal amplifying station remains constant within 0.1 db.

It is consequently found that by using the carrier-wave telephone system shown unwanted level variations are reduced to a minimum by the cooperation of the amplifying stations, whilst at the same time the level control is free from interference to a surprising extent.

As stated above the level control-devices of a plurality of intermediate amplifying stations are simultaneously operative during a change-over of the control-system for example due to an interference or to a damping variation of the cable. If a level control-device in an intermediate amplifying station becomes operative, the pilot level in the further intermediate amplifying stations varies correspondingly and thus affects the relative control-system. It has been found that during such a change-over the resultant level variations due to the simultaneous operation of the control-systems in a plurality of intermediate amplifying stations do not always lie within the values determined by the response values $p_1$ and $p_2$ but are liable to exceed these response values $p_1$ and $p_2$ for a short time. In the embodiment shown the response levels $p_1$ and $p_2$ are exceeded on an average by about 1 to ½ db.

Particularly for the transmission of signals over very large distances it is desirable to minimize the amplitude of the resultant level variations, since their mean value increases with the number of amplifying stations.

This is achieved by using the amplifying station shown in Fig. 5, the construction of which corresponds in principle to the amplifying stations described already with reference to Fig. 4. Corresponding elements are designated by the same reference numerals.

In the embodiment shown the pilot receiver comprises a rectifying stage 69, having an output circuit including the series combination of a capacitor 71, shunted by a resistor 70, and a resistor 72; to this series resistor 72 is connected the control-circuit 30 of the control-motor 29. The capacitor 71 together with the series resistor 72 constitutes a differentiating network for the variations of the pilot level occurring during a change-over of the control-systems in the intermediate amplifying stations.

Across the resistor 72 occurs not only a voltage varying with the pilot level but also a voltage which varies with the time derivative of the pilot level variations during a change-over; in other terms, at a change-over of the control-system the response levels of the control-systems in the intermediate amplifying stations are so to say reduced by using the time derivative of the pilot level variations.

In the embodiment shown, in which the control speed is 0.1 db per second, the following values are chosen for the elements included in the output circuit of the rectifier:

| | |
|---|---|
| Resistor $R_{70}$ | 10KΩ |
| Resistor $R_{72}$ | 1KΩ |
| Capacitor $C_{71}$ | 500μf. |

In order to reduce unwanted reflex phenomena in the transmission of television signals in a frequency band of for example 300 kc./s. to 6 mc./s., one or more damping branches may be advantageously included in a shunted T-filter, as shown and described in the said copending U.S. patent application. In a particularly favourable embodiment the damping branch with the series resistor and variable series capacitor constitutes the parallel branch in the shunted T-filter, of which the series impedances formed by two resistors are shunted by the parallel combination of a parallel resistor and a variable inductor having an adjusting member secured to the common driving shaft of the capacitors. The damping branch and the series branch with the parallel resistor and the parallel inductor constitute relatively reciprocal impedances.

After the foregoing it will be obvious that as a level control-member in an intermediate amplifying station use may be made of an artificial cable impedance of a different type; this may for example be formed by the series combination of a plurality of branches, each of which includes a variable inductor shunted by a resistor, the adjusting members of which inductors are coupled through a common shaft with the shaft of the control-motor.

It should finally be noted that in a terminal station not only a thermistor control but also a level control by means of a control-motor may be carried out; the output voltage of the pilot receiver, subsequent to amplification in an energy amplifier, may for example be supplied as an energizing voltage to a control-motor in order to re-adjust an artificial cable impedance connected before the input of the terminal amplifying station.

What is claimed is:

1. A communication system comprising a transmission path including a transmission cable, a source of a communication signal connected to said cable at an end of said transmission path, a source of a pilot signal connected to said cable at said end of the transmission path, a terminal amplifying station connected to said cable at the other end of said transmission path and an intermediate amplifying station connected to said cable at an intermediate point of said transmission path, each of said amplifying stations comprising a pilot receiver connected to receive said pilot signal and produce a control voltage in accordance with the received amplitude of said pilot signal and an amplification level control member connected to control the amplification of the respective amplifying station in accordance with said control voltage, the amplification level control member of said intermediate amplifying station comprising an adjustable line-balancing impedance connected to said cable, a control motor connected to adjust the value of said line-balancing impedance, and a maximum-minimum contact voltmeter connected between said motor and the receiver of said intermediate amplifying station whereby said line-balancing impedance is selectively adjustable to two values of impedance in accordance with the amplitude of the received pilot signal, the amplification level control member of said terminal amplifying station comprising an adjustable impedance connected to affect the amplification of said signals, and means connected to vary the value of said last-named adjustable impedance substantially proportionally to the value of the control voltage produced by the receiver in said terminal amplifying station.

2. A system as claimed in claim 1, in which said line-balancing impedance comprises a plurality of electrical damping branches connected in parallel across said cable, each said branch including a resistor and a variable capacitor connected in series, each of said variable capacitors comprising a rotor plate attached to a common shaft, and means for mechanically coupling said shaft to said control motor.

3. A system as claimed in claim 2, in which at least one of said damping branches comprises a shunted T-filter having a resistor and a variable inductor connected in parallel across the series impedances thereof, said variable inductor having an adjusting member coupled mechanically to said common shaft.

4. A system as claimed in claim 1, in which said adjustable impedance in the terminal amplifying station comprises a thermistor having a filament wire, the amplification level control member of said terminal amplifying station comprising a control oscillator connected to apply oscillations to said filament wire, and means for controlling said control oscillation with the control voltage produced by the pilot receiver in said terminal amplifying station.

5. A system as claimed in claim 1, in which said maximum-minimum contact voltmeter comprises a maximum contact, a minimum contact, and a pointer contact, a first relay having a normally closed contact and having an energizing coil connected between said minimum contact and said pointer contact, a second relay having a normally closed contact and having an energizing coil connected between said maximum contact and said pointer contact, a source of energizing voltage connected to said relay coils whereby said relays are normally energized thereby opening said relay contacts, a pair of energizing circuits connected to said motor for causing said motor to operate in opposite directions, and means connecting said relay contacts respectively in said motor energizing circuits.

6. A system as claimed in claim 5, in which said first relay has a pair of normally open contacts one of which is connected to said maximum contact, said second relay having a pair of normally open contacts one of which is connected to said minimum contact, a junction connected to the remaining contacts of each of said pair of normally open contacts, two pairs of normally closed contacts connected in series between said junction and the pointer contact of said maximum-minimum contact voltmeter, and means for opening said pairs of normally closed contacts respectively whenever said motor has adjusted said artificial cable impedance to one or the other of said two values of impedance.

7. A system as claimed in claim 6, in which said control motor is an asynchronous alternating-current motor having two energizing windings, and including an energizing source for said windings, the normally closed contacts of said relays being connected respectively between said energizing windings and said energizing source.

8. A system as claimed in claim 6, including a third relay having an energizing winding connected to be energized by said control voltage produced by the pilot receiver in said intermediate amplifying stage and a pair of contacts connected to prevent said motor from being energized when said pilot signal is absent.

9. A system as claimed in claim 1, in which the speed of response of said amplification level control member in the terminal amplifying station is sufficiently fast to follow the amplification level variations caused by said amplification level control member in the intermediate amplifying stage.

10. A system as claimed in claim 1, in which the amount of amplification change produced in said intermediate amplifying station due to the transition from one to another of said two values of line-balancing impedance is approximately ¾ of the difference in the levels of said pilot signal required for actuating said maximum-minimum contact voltmeter in its maximum and minimum modes of operation.

11. A system as claimed in claim 1, in which said intermediate amplifying station comprises a differentiating network connected between the pilot receiver and the maximum-minimum contact voltmeter for applying a differentiated control voltage to said voltmeter, and means for feeding said control voltage also to said voltmeter.

12. A system as claimed in claim 11, in which said differentiating network comprises a series-connected capacitor and a shunt-connected resistor, said last-named means comprising a resistor connected in parallel with said capacitor.

References Cited in the file of this patent

UNITED STATES PATENTS

| | | |
|---|---|---|
| 1,956,547 | Black | May 1, 1934 |
| 2,084,115 | Terry | June 15, 1937 |
| 2,178,333 | Blair | Oct. 31, 1939 |
| 2,293,750 | Leibe | Aug. 25, 1942 |
| 2,304,545 | Clement | Dec. 8, 1942 |